C. I. E. MASTIN.
METHOD OF MAKING PISTON ROD PACKINGS.
APPLICATION FILED DEC. 7, 1914.
1,184,469.
Patented May 23, 1916
2 SHEETS—SHEET 1.
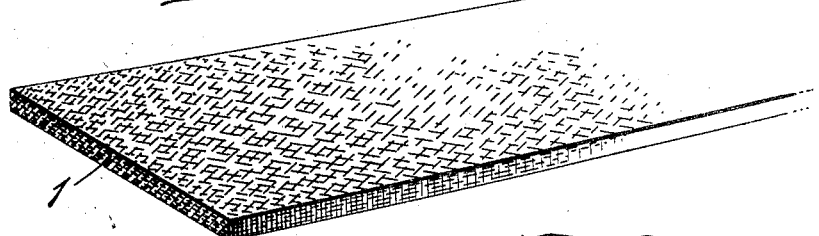
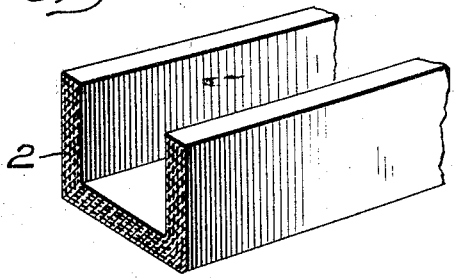 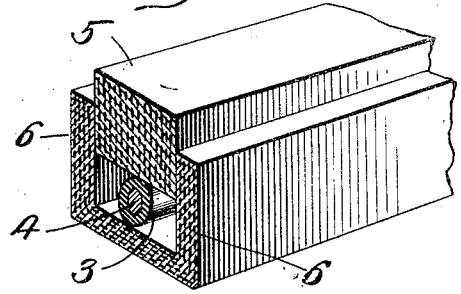
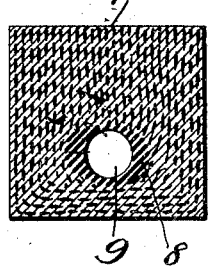 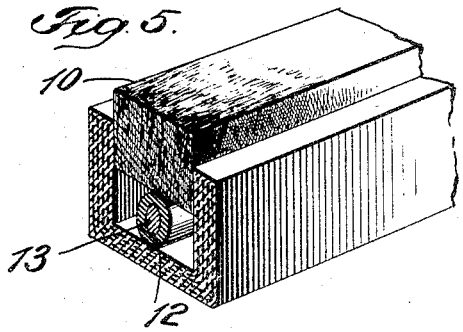
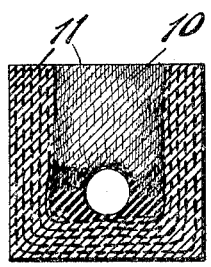
Witnesses:
Inventor
Charles I. E. Mastin,
By Attorney C. I. E. MASTIN.
METHOD OF MAKING PISTON ROD PACKINGS.
APPLICATION FILED DEC. 7, 1914.
1,184,469.
Patented May 23, 1916.
2 SHEETS—SHEET 2.
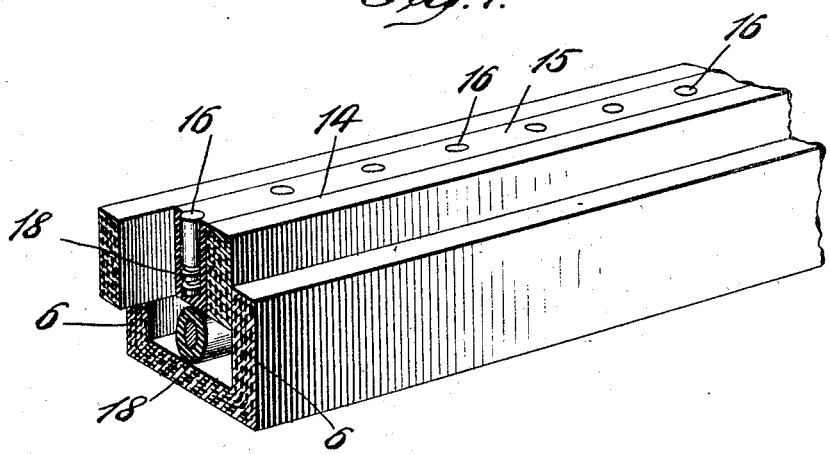
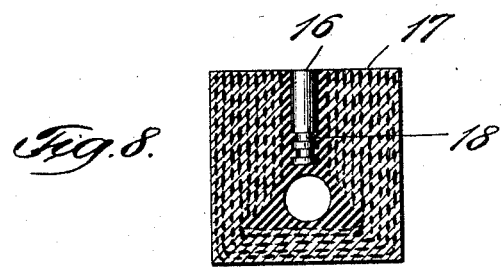
Witnesses:
Inventor
Charles I. E. Mastin,
By Attorney

UNITED STATES PATENT OFFICE.

CHARLES I. E. MASTIN, OF MIDLAND PARK, NEW JERSEY.

METHOD OF MAKING PISTON-ROD PACKINGS.

1,184,469.   Specification of Letters Patent.   Patented May 23, 1916.

Application filed December 7, 1914. Serial No. 875,795.

*To all whom it may concern:*

Be it known that I, CHARLES I. E. MASTIN, a citizen of the United States, and resident of Midland Park, county of Bergen, and State of New Jersey, have invented certain new and useful Improvements in Methods of Making Piston-Rod Packings, of which the following is a specification.

This invention relates to a packing for piston rods and other moving parts of engines and machinery where a tight joint to prevent the passage of steam, air, oil, or water is required; and also relates to a new method of making said packing.

One of the main objects of the invention is to provide a packing of simple construction which will be durable and yet yielding and elastic.

Another object of the invention is to provide a simple method of constructing the packing whereby it may be provided with a longitudinally extending rubber core having a longitudinally extending aperture therethrough, whereby the packing will be elastic and will yield to the lateral vibrations of the piston rod or other moving part.

There are other objects and advantages of the invention, all of which will be fully hereinafter described.

In the drawings, Figure 1 is a detail perspective view of a portion of a sheet or slab of packing material before it is shaped to constitute the outer shell of the packing; Fig. 2 a detail perspective view of the slab or sheet of packing material shaped to constitute the outer shell of the packing; Fig. 3 a similar view showing all of the parts of the packing assembled and before they are compressed to form the complete packing; Fig. 4 a transverse sectional view of the complete packing strip after it has been compressed and vulcanized; Fig. 5 a detail sectional perspective view of the parts of the packing assembled and before they are compressed, and showing a filling of asbestos; Fig. 6 a transverse sectional view of the complete packing strip made up as shown in Fig. 5; Fig. 7 a detail sectional perspective view similar to Figs. 3 and 5, the filling block being provided with soft metal plugs or studs; and Fig. 8 a transverse sectional view of the complete packing strip made up as shown in Fig. 7.

In forming my packing I use a thin slab, as 1, made up of alternate layers of fabric, such as comparatively loosely woven cotton duck, and interposed layers of rubber cement. This slab or sheet is cut of the proper width and is then shaped or molded into channel form as shown at 2 in Fig. 2. This shaping may be done in any suitable manner, preferably in a suitable mold, and while in the shaping mold it is subjected to sufficient heat to partly vulcanize or cure it to hold it in its channel shape. A rubber tube 3 is placed in this channel, said tube being of the desired thickness and of the desired diameter, and through this tube is placed a solid mandrel or rod 4. In the channel is also placed a filling block 5, the tube 3 and the block 5 being arranged in the channel as illustrated in Fig. 3. The filling block 5, as shown in Fig. 3, is made up of alternate layers of cotton duck and rubber, the said layers being arranged parallel with the layers of duck and rubber in the parallel members 6 of the channel 2. When the parts are arranged as shown in Fig. 3 they are placed in a mold and subjected to a heavy pressure in order to condense the fabric layers and to distort the rubber of the tube 3 to cause it to fill the space between the filling block and the walls of the channel. At the same time the channel is contracted and condensed, as also are the layers of cotton duck in the filling block 5. Under this pressure the packing is brought to the condition shown in Fig. 4 wherein all the parts are brought closely together. While the assembled parts of the packing are in this compressed condition they are subjected to heat at a sufficiently high temperature to vulcanize or cure the rubber and thereby fix the packing in the dimensions and in the condition to which it is brought by the pressure in the mold. The filling block is forced into the channel sufficiently to bring its outer surface flush with the edges of the members 6 of the channel. It is to be noted that the edges of the duck layers in the members 6 in the filling block appear on the surface 7 of the completed packing strip and said surface forms the wearing face of the packing which is adapted to be arranged next to the piston rod or other moving part to be packed. The threads in the layers of duck in the slab 1 are on the bias, as are also the threads in the layers of duck in the filling block. By reason of this the ends only of the fabric threads appear on the wearing surface and, therefore, all of the wear occasioned by the moving parts is directly on the ends of said threads. The rubber tube, after it has become incorporated in the completed packing, forms a rubber cushion 8 at the bottom of the channel and between said channel wall and the filling block, so that the filling block may have a slight inward yielding in response to the lateral vibrations of the piston rod or other moving part to be packed. The aperture 9 formed by the mandrel 4 materially adds to the flexibility and resilience of the packing strip and also permits the packing to yield under the lateral vibrations of the piston rod.

In Fig. 5 the falling block 10 is made up of asbestos fabric so that the wearing surface 11 of the completed packing strip, as shown in Fig. 6 is made up partly of asbestos and partly of the layers of rubber and cotton duck. This form of packing is especially adapted for certain classes of machines and for working under certain conditions. In making up this form of the packing a rubber tube 12 is placed in the channel, as shown in Fig. 5, and through this tube is arranged a mandrel 13. When the assembled parts of the packing are subjected to pressure in a mold and to heat they are vulcanized and cured in one homogeneous mass and form a complete one-piece packing, as shown in Fig. 6.

In Fig. 7, a filling block 14 is shown made of alternate layers of duck and rubber with a central, longitudinally extending, thick rubber section 15. In this rubber section or layer are inserted plugs 16 of soft metal, the ends of said plugs being flush with the wearing surface 17 of the completed packing strip, as shown in Fig. 8. In this form of filling block the layers of cotton duck are parallel with the layers of duck in the members 6 of the channel 2. In this form of the packing a tube 18 of rubber is placed in the channel precisely as described with respect to Figs. 3 and 5. The assembled parts or sections of the packing as shown in Fig. 7 are subjected to pressure in a mold and to heat to reduce the dimensions of the assembled parts of the strip and to cure or vulcanize them into one homogeneous mass, with the ends of the pins 16 flush with the wearing surface 17 of the packing strip. The pins 16 are preferably formed with annular grooves 18 at their inner ends and by which they are securely anchored in the rubber strip 15.

The form of packing illustrated in Figs. 7 and 8 is especially adapted for certain uses and in certain classes of machines.

From the foregoing it is manifest that I provide a packing of very simple construction which will be yieldable and elastic and very durable. It is also clear that by my method of assembling the parts and then compressing and curing them in their compressed condition a packing strip having a longitudinally apertured rubber core is produced in a very simple and inexpensive manner, and in which the edges of the fabric layers are presented to the moving part to be packed, and the ends only of the threads in said fabric layers are in contact with said moving part.

The packing is first molded in long strips, said strips being pressed and cured in a mold. This strip may be coiled spirally if desired and subjected to heat to preserve it in its spiral form. After the curing process, the packing is lubricated in a suitable manner.

What I claim is:

The process of manufacturing one-piece piston rod packing consisting in forming a slab of alternate layers of fabric and rubber, shaping said slab into channel form, placing in said channel a rubber tube of the proper thickness and diameter, placing a mandrel in said tube, inserting a filling block of suitable wearing material in said channel, compressing said assembled parts to reduce the packing to the desired dimensions and to force the filling block into the channel, and then subjecting the compressed packing strip to heat, to vulcanize the rubber and to permanently unite all of the parts in one homogeneous mass.

In testimony whereof I hereunto affix my signature in the presence of two witnesses.

CHARLES I. E. MASTIN.

Witnesses:
F. R. MILLER,
MINERVA VAN ALEN.